United States Patent
Rohn et al.

(10) Patent No.: US 6,174,350 B1
(45) Date of Patent: Jan. 16, 2001

(54) VACUUM CLEANER

(75) Inventors: Dean Rohn; Steven Ray Selewski, both of Cadillac, MI (US); William R. Daws, Honolulu, HI (US)

(73) Assignee: Rexair, Inc., Troy, MI (US)

(*) Notice: Under 35 U.S.C. 154(b), the term of this patent shall be extended for 0 days.

(21) Appl. No.: 09/302,212

(22) Filed: Apr. 29, 1999

Related U.S. Application Data (63) Continuation-in-part of application No. 09/298,137, filed on Apr. 23, 1999.

(51) Int. Cl.$^7$ .................................................. B01D 47/02
(52) U.S. Cl. .......................... 95/218; 15/353; 55/DIG. 3; 95/226; 96/337; 96/340; 96/342; 96/351
(58) Field of Search ....................... 15/347, 353; 95/226, 95/218; 96/351, 333, 334, 342, 348, 329, 340, 337, 338, 339, 134, 135; 59/DIG. 3, 486, 487, 502, 511, 495, 497, DIG. 31

(56) References Cited

U.S. PATENT DOCUMENTS

| | | | |
|---|---|---|---|
| 2,102,353 | * 12/1937 | Brock | 96/334 |
| 2,184,731 | * 12/1939 | Brewer | 96/337 |
| 2,189,021 | * 2/1940 | Schury | 96/334 |
| 2,221,572 | * 11/1940 | Brock et al. | 96/333 |
| 2,954,095 | * 9/1960 | Brock | 96/342 |
| 3,234,713 | * 2/1966 | Harper et al. | 96/342 |
| 3,279,157 | 10/1966 | Andersson-Sason et al. | |
| 3,609,946 | 10/1971 | Nakagawa et al. | |
| 3,841,067 | 10/1974 | Kato et al. | |
| 4,036,346 | 7/1977 | Livingston | |
| 4,342,131 | 8/1982 | Reid | |
| 4,382,440 | * 5/1983 | Kapp et al. | 96/134 |
| 4,547,206 | * 10/1985 | Sovis et al. | 55/DIG. 3 |
| 4,610,705 | * 9/1986 | Sarnosky et al. | 55/DIG. 31 |
| 4,693,734 | * 9/1987 | Erickson, Jr. | 96/333 |
| 4,737,174 | * 4/1988 | Pontius | 55/DIG. 31 |
| 4,838,907 | 6/1989 | Perry | |
| 4,851,017 | * 7/1989 | Erickson et al. | 96/351 |
| 5,022,115 | * 6/1991 | Kasper | 96/333 |
| 5,030,257 | * 7/1991 | Kasper et al. | 96/333 |
| 5,090,974 | * 2/1992 | Kasper et al. | 96/333 |
| 5,096,475 | * 3/1992 | Kasper et al. | 96/333 |

(List continued on next page.)

FOREIGN PATENT DOCUMENTS

| | | | |
|---|---|---|---|
| 591673 | * 4/1994 | (EP) | 96/134 |
| 5-245325 | * 9/1993 | (JP) | 96/134 |

Primary Examiner—Duane S. Smith
(74) Attorney, Agent, or Firm—Howard & Howard (57) ABSTRACT

A vacuum cleaner assembly (10) includes a main housing (12) having an inlet (14) and an outlet (16). A motor (17a) is disposed within the main housing (12) for providing motive force to a cooling fan (17b), a blower (17c), and a separator (22). The separator (22) circulates the air and water bath (20) within a water bath pan (36) and provides, in combination with the water bath (20), a primary filter for filtering the air. A second filter assembly (24) is also provided preferably including a high efficiency filter (100 or 100a), or HEPA rated filter, for filtering microscopic dust and dirt particles that escape the separator (22) and water bath (20) and is disposed after both the water bath (20) and the separator (22) for additional filtering of the air. Alternatively, it may be a non-HEPA rated filter (101). The second filter assembly (24) may also include a third filter element, which may be a carbon impregnated filter (110) for absorbing or trapping odors and is disposed in the air flow path after the second filter (100, 101, or 100a). The second filter (100, 100a or 101) and third filter (110) element are secured in a frame (112) as part of the second filter assembly (24). The second filter (100, 101 or 100a) and the carbon impregnated filter (110) within the frame (112) are disposed in a recess (26) which is integral with the main housing (12) allowing for direct and efficient flow of the air through the water bath (20), separator (22), and second filter assembly (24).

20 Claims, 5 Drawing Sheets

U.S. PATENT DOCUMENTS

| | | | |
|---|---|---|---|
| 5,125,129 | * | 6/1992 | Kasper et al. .......................... 96/333 |
| 5,199,963 | * | 4/1993 | Scarp ............................... 55/DIG. 3 |
| 5,226,937 | * | 7/1993 | Linnersten et al. .................... 96/134 |
| 5,259,087 | | 11/1993 | Loveless et al. . |
| 5,280,666 | | 1/1994 | Wood et al. . |
| 5,301,388 | | 4/1994 | Zeren . |
| 5,339,487 | | 8/1994 | Kasper . |
| 5,388,301 | | 2/1995 | Bosyj et al. . |
| 5,423,903 | * | 6/1995 | Schmitz et al. ........................ 96/134 |
| 5,535,500 | | 7/1996 | Stephens et al. . |
| 5,537,710 | | 7/1996 | Selewski et al. . |
| 5,752,997 | * | 5/1998 | Roth ................................ 55/DIG. 3 |
| 5,961,677 | * | 10/1999 | Scott ............................... 55/DIG. 3 |

* cited by examiner

VACUUM CLEANER

CROSS REFERENCE TO RELATED APPLICATIONS

This application is a continuation-in-part of presently pending U.S. application entitled IMPROVED FILTER FOR VACUUM CLEANER filed Apr. 23, 1999 Ser. No. 09/298,137.

BACKGROUND OF THE INVENTION

1. Field of the Invention

This invention relates to a vacuum cleaner of the type for household use.

2. Description of the Prior Art

Water bath vacuum cleaners typically include a main housing with a removably attached water bath pan. An intake opening in the water bath pan matingly engages an inlet in the main housing of the vacuum cleaner to allow dust and dirt entrained air to be ingested by a vacuum force through the inlet into the area defined by the water bath pan. The primary advantage of the water bath filter is that vacuum efficiency is not compromised as more dirt and dust is accumulated in the water bath, and no further filtering is viewed as necessary. The dust and dirt are trapped in the water bath as the incoming air is directed into the water bath pan and circulated within. Traditional filtering media allow the flow of air through the filtering media to be impeded by the accumulation of the dirt and dust that has collected thereon. However, just as traditional filter media will allow very tiny microscopic particles to escape capture, the water bath and separator may also fail to capture all of the very small or microscopic particles that are light enough to remain suspended in the air as the air circulated in the water bath pan.

High efficiency filters, or HEPA rated filters, are used on vacuum cleaners in industrial and residential applications. These filters are made up of filter media with very tiny openings that are designed to capture the smallest microscopic particles that most traditional filter media or methods are incapable of capturing. The major drawback to the use of these types of filters is that due to the small size of the openings in the filter media, they capture all of the dirt and debris that hits them thereby clogging up very quickly, and requiring cleaning or replacement very often. For this reason, some vacuum cleaning products try to combine the HEPA rated filter with a more conventional dry filter media. The conventional dry filter media will capture the larger particles of dirt and debris, and the HEPA rated filter will only capture the smaller particles that escape the conventional dry filter media. The overall efficiency of the vacuum cleaner (and the conventional dry filter media) is affected as the air is redirected and routed through the additional filter. Also, the full area of the high efficiency filter is not utilized because the air is typically directed through a small opening in the main housing of the vacuum cleaner, which concentrates the flow of air on the portion of the high efficiency filter that is directly in front of the opening.

SUMMARY OF THE INVENTION AND ADVANTAGES

The present invention relates to a vacuum cleaner assembly comprising a main housing having an inlet and an outlet. A motor is disposed within the main housing between the inlet and the outlet for providing motive force to a cooling fan, a blower, and a separator. The cooling fan is mounted within the main housing above the motor to circulate cooling air around the motor. A baffle is mounted within the main housing for directing the cooling air around the motor, and to filter the air that is circulated around the motor before that air is exhausted. The blower is mounted within the main housing below the motor for drawing air into the inlet and exhausting air outwardly through the outlet. The separator is mounted below the blower for circulating the air and water within a water bath and providing, in combination with the water bath, a primary filter for filtering the air prior to exhausting the air outwardly through the outlet. A second filter assembly including a high efficiency filter, known as a HEPA rated filter, for filtering microscopic dust and dirt particles that escape the separator and water bath and may be disposed after both the water bath and the separator and before the outlet to atmosphere for additional filtering of the air prior to being exhausted. The second filter assembly may also include a third filter comprising a carbon impregnated filter of a reticulated foam or similar material for absorbing or trapping odors drawn from the air, including smoke and fish odors. The second filter and the carbon impregnated filter are disposed in a recess which is integral with the main housing allowing for direct and efficient flow of the air through the water bath, separator, second filter, and carbon impregnated filter. In an alternative embodiment, the second filter can be a non-HEPA filter used in combination with the carbon impregnated filter.

Accordingly, the present invention will utilize the separator and water bath filter to capture the larger particles of dirt and debris prior to routing the air through the second, HEPA rated or non-HEPA rated filter to capture microscopic particles that escape the water bath, and finally through the carbon impregnated filter to absorb or trap odors. The recess for the high efficiency filter is located integrally to the main housing allowing the air to flow directly from the water bath canister through the second filter and the carbon impregnated filter with minimal redirection of the air and no noticeable impact on the primary filter. This will allow the air to flow smoothly through the series of filters. The second filter assembly will not be overly clogged because the separator and water bath will capture the majority of the larger dust and dirt particles before the air goes through the second filter assembly. The recess is designed to allow the majority of the surface area of the high efficiency filter to be in the direct line of airflow thereby the overall efficiency of the vacuum cleaner is maximized.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views a vacuum cleaner assembly is generally shown at 10. The vacuum cleaner assembly 10 includes a main housing 12 having an inlet 14 and an outlet 16. A motor 17a is supported by support rings 18 within the main housing 12 between the inlet 14 and the outlet 16 for providing motive force to a cooling fan 17b, a blower 17c, and a separator 22. The cooling fan 17b is mounted within the main housing 12 above the motor 17a to circulate cooling air around the motor 17a. A baffle 19 surrounds the motor 17a to direct the cooling air around the motor 17a and to filter the cooling air prior to being exhausted. The blower 17c is mounted within the main housing 12 below the motor 17a for drawing air into the inlet 14 and exhausting air outwardly through the outlet 16. The separator 22 is mounted below the blower 17c for circulating the air and a water bath 20 within a water bath pan 36 and providing, in combination with the water bath 20, a primary filter for filtering the air prior to exhausting the air outwardly through the outlet 16.

Vacuum cleaners using a water bath 20 filter are known to those skilled in the art as described in U.S. Pat. No. 5,096,475, which is hereby incorporated by reference to this specification.

Figures 4, 5:
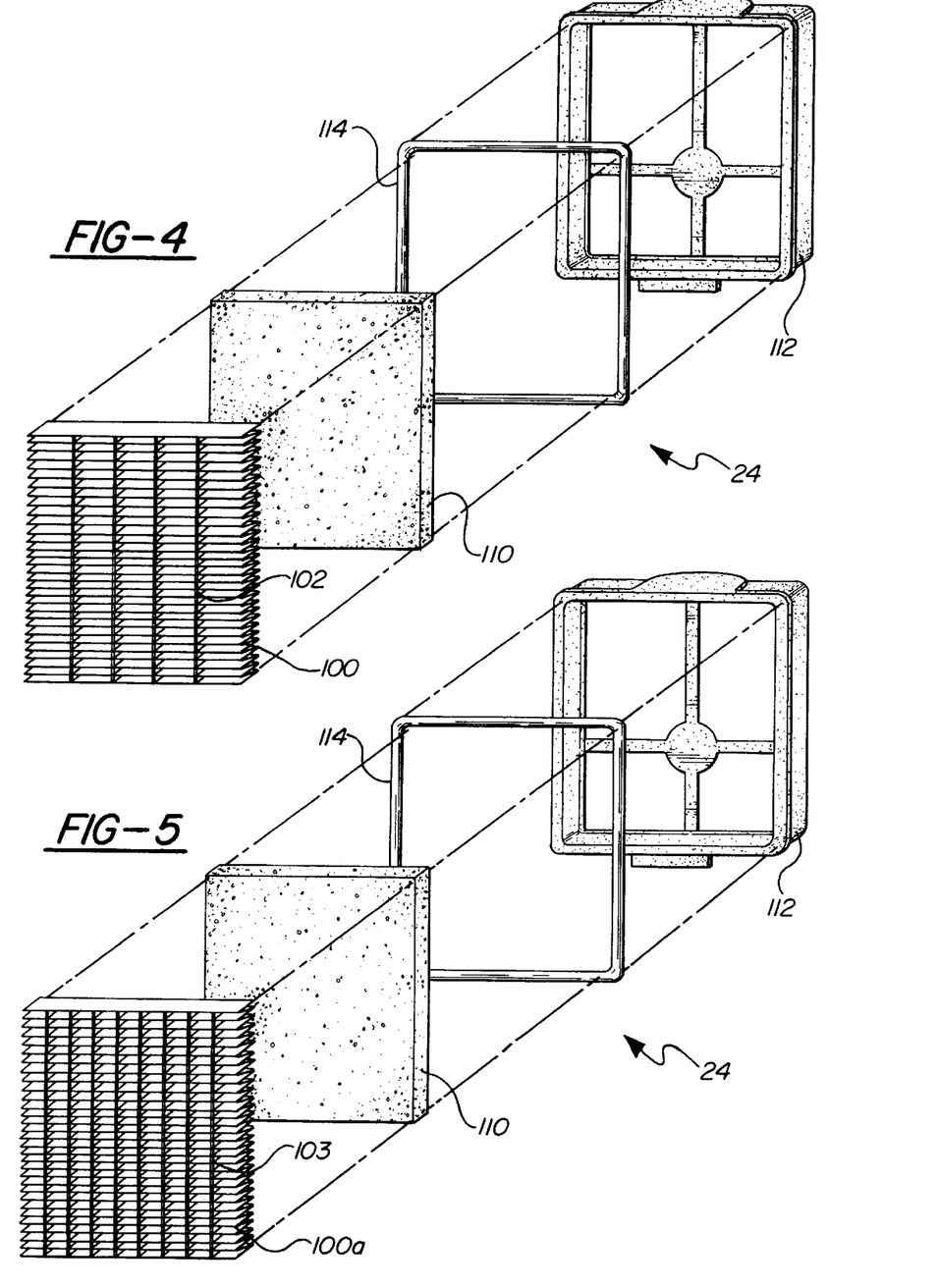
FIG. 4 is an exploded perspective view of the second filter assembly including a five sectioned HEPA rated filter and a carbon impregnated reticulated foam filter.
FIG. 5 is an exploded perspective view of the second filter assembly including a nine sectioned HEPA rated filter and a carbon impregnated reticulated foam filter.

A second filter assembly 24 is secured to the main housing 12 and preferably includes a high efficiency filter 100 or 100a, known as a HEPA rated filter, for filtering microscopic dust and dirt particles that escape the separator 22 and water bath 20 and is disposed after both the water bath 20 and the separator 22 and before the outlet 16 for additional filtering of the air prior to being exhausted. The differences between filter 100 and filter 100a are shown in FIGS. 4 and 5. The filter 100 has compartments sectioned along five sets of ribs 102, and made preferably of sheet polypropylene. The filter 100a has compartments sectioned along nine sets of ribs 103. The ribs maintain the integrity of the filter against air pressure and other environmental effects and are preferably made from hot melt glue, although stamped aluminum and plastic ribs are alternatives.

Figures 6, 7:
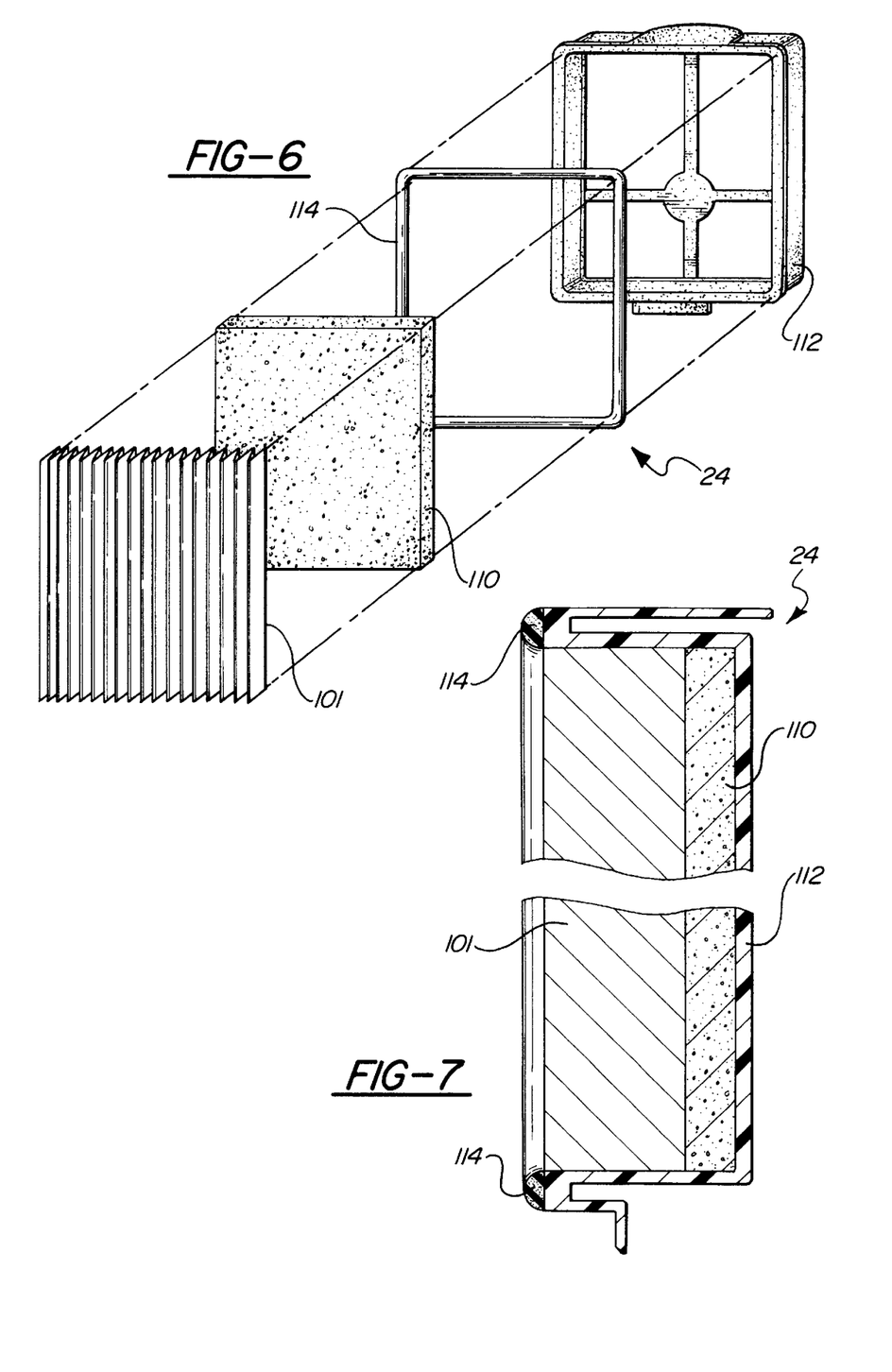
FIG. 6 is an exploded perspective view of the second filter assembly including a filter that is not HEPA rated and a carbon impregnated reticulated foam filter.
FIG. 7 is a cross-section along lines 7—7 of FIG. 2.

In another alternative embodiment, the second filter assembly 24 can include a filter that is not HEPA rated 101, as shown in FIG. 6 and combined in the description as discussed below and shown in FIG. 6.

Figure 1:
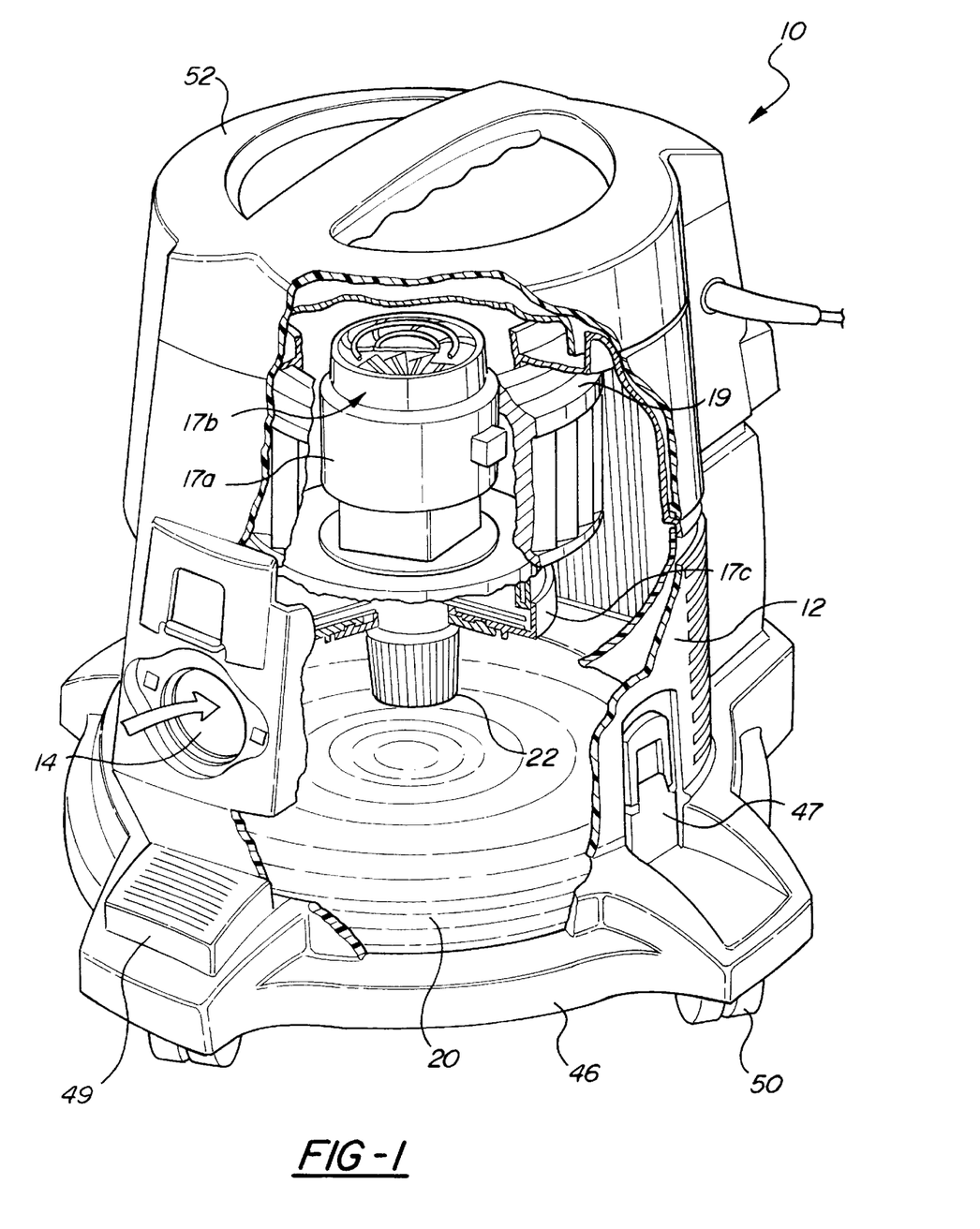
FIG. 1 is a perspective view of the vacuum cleaner assembly, partially broken away and in cross section.
Figure 2:
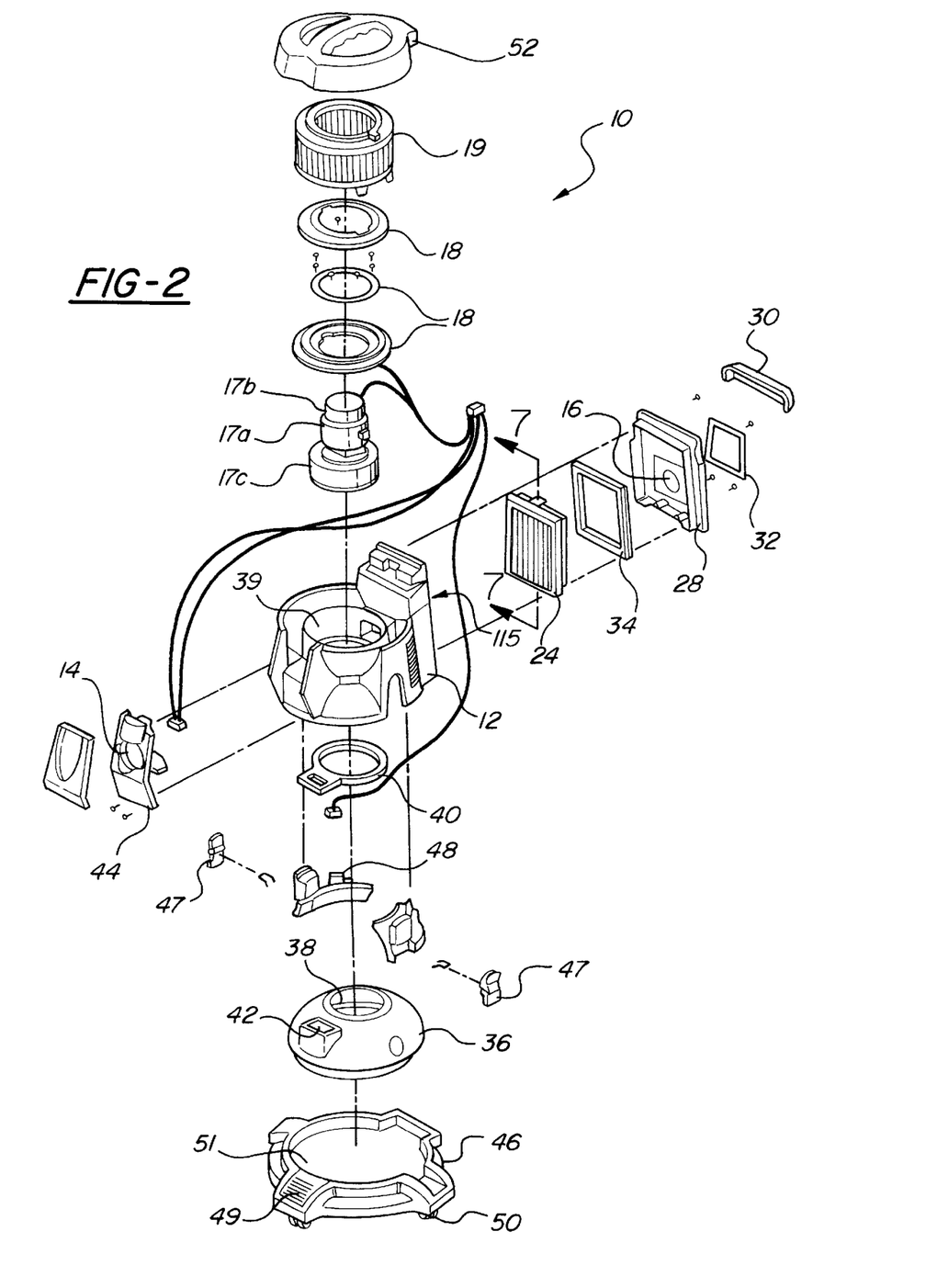
FIG. 2 is an exploded perspective view of the vacuum cleaner assembly.
Figure 3:
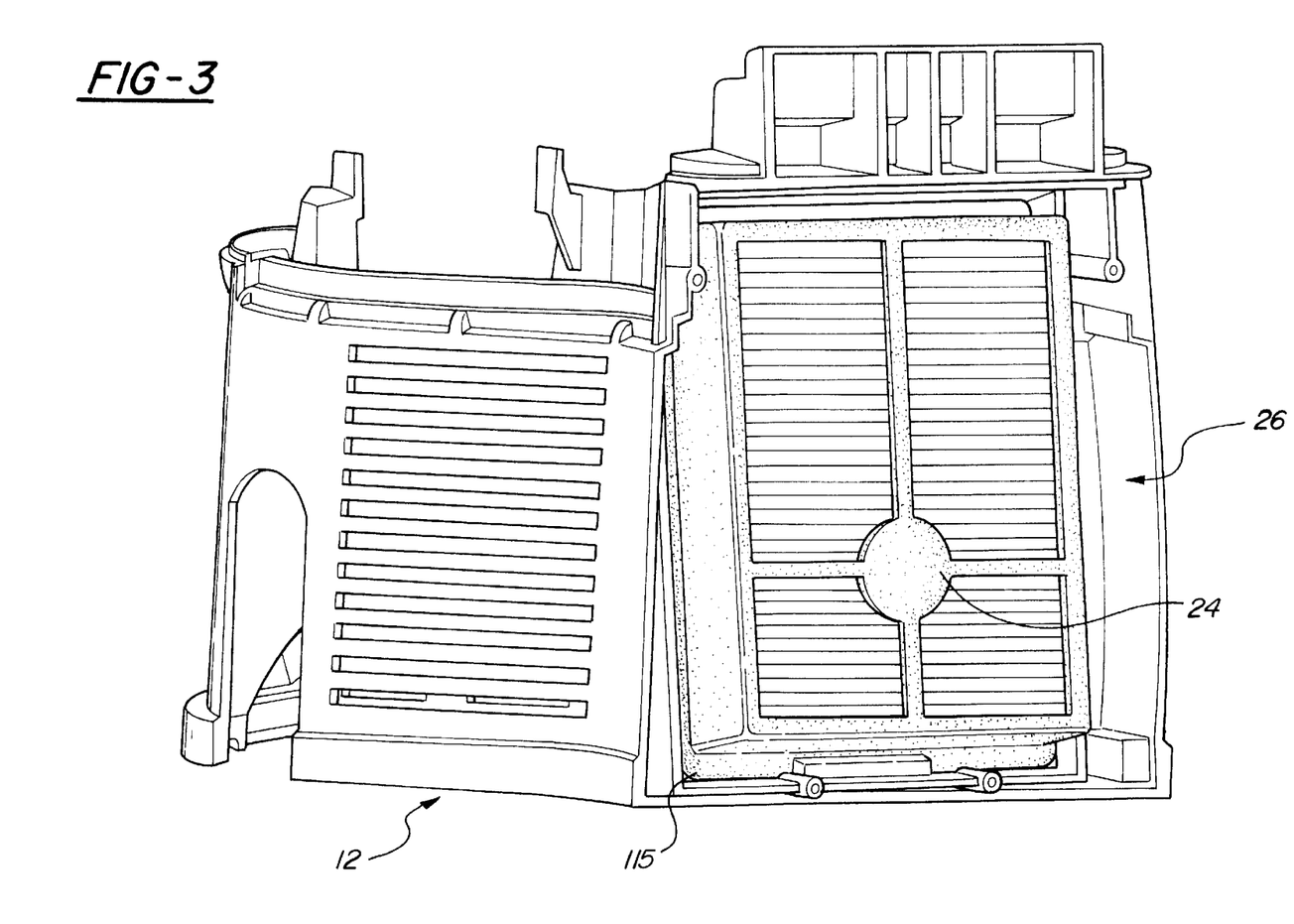
FIG. 3 is an elevational view of the vacuum cleaner main housing shown with the second filter seated in the recess defined by the housing.

As a further alternative, a third filter 110 can be included as shown in FIGS. 4, 5 and 6 which comprises a carbon impregnated reticulated foam filter 110 for absorbing or trapping odors and is disposed in the air flow after the second filter 100, 100a or 101 and before the outlet 16 to atmosphere. The second filter 100, 101, or 100a and the carbon impregnated filter 110 are secured together by glue or some equivalent means into a molded styrene frame 112 with a sealing gasket 114 associated with one edge of the frame 112. This is shown in section in FIG. 7 where the filter of FIG. 2 is shown with the non-HEPA rated filter configuration of filter 101, but which could just as readily be shown with the HEPA rated filter configurations of 100 or 100a inserted for the filter 101. The surface area of the frame 112 adjacent the main housing 12 is at least five times larger than the surface area of the main housing 12 outlet. Preferably, the surface area of the frame 112 adjacent the main housing is nine times larger than the surface area of the main housing 12 outlet. The main housing 12 defines a recess 26 and the second filter assembly 24 is seated in that recess 26 with the sealing gasket 114 sealing against the main housing 12 at surface 115 to force the air to the outlet 16 through the second filter assembly 24.

FIG. 2 shows an exploded view of the vacuum cleaner assembly 10. The second filter assembly 24 is secured in position by a rear cover 28 which is removably attached to the main housing 12 via screws to cover the opening of the recess 26 and secure the second filter assembly 24 in position. The rear cover 28 includes a stowage device 30 for stowing an electrical cord. A foam seal 34 is disposed between the assembly 24 and the rear cover 28 to cushion and sound deaden that area of the vacuum as well as further prevent air from escaping anywhere other than via the outlet 16. The second filter assembly 24 has smaller openings to capture particles passing through the separator 22 and water bath 20. In the preferred embodiment, the second filter assembly 24 includes a HEPA rated filter 100 or 100a for capturing tiny microscopic dust and dirt particles.

Reuseable washable HEPA rated filter media, such as a pleated GORE-TEXtm material, can also be used as the second filter 100 or 100a. Preferably, the reuseable washable filter media would be used as a HEPA rated filter, although if the particulate penetration size of the media selected were greater, the filter media would not be a HEPA rated filter, such as is the case with filter 101. Reuseable washable filter media would be advantageous in this device because it can be washed and reused along with or intermittently with the disposal of the water bath 20 from the water bath pan 36 after use.

The vacuum cleaner assembly 10 includes a water bath pan 36 for containing the water bath 20. The water bath pan 36 presents a first opening 38 which is disposed directly below the main housing 12 which has a bottom opening 39 that corresponds to the first opening 38 in the water bath pan 36. A foam seal 40 forms a sealed engagement between the water bath pan 36 and the bottom opening 39 of the main housing 12. The water bath pan 36 also includes a second opening 42 which corresponds to a tubular member extending from an inlet face plate 44. The foam seal 40 forms a sealed engagement between the second opening 42 in the water bath pan 36 and the inlet face plate 44. The inlet face plate 44 is mounted to the main housing 12 at the inlet 14 and allows attachments to be connected in direct communication with the inlet 14.

The motor 17a is centrally supported by support rings 18 in the main housing 12 above the bottom opening 39. The separator 22 is attached to the motor 17a below the blower 17c and extends downwardly through the bottom opening 41 in the main housing 12 and the first opening 38 in the water bath pan 36. The separator 22 is rotated by the motor 17a for circulating the air within the water bath pan 36 and for drawing the dust and dirt entrained air, along with water from the water bath 20, within the separator 22 for further capture of debris in the water bath 20 and to direct, by centrifugal force, the water and any remaining dirt or dust back outward into the water bath pan 36 for additional separation as it is drawn within the separator 22 again. As the dust, dirt, and water are forced outward from the separator by centrifugal force, the filtered air is drawn upward out of the separator 22 outwardly through the second filter assembly 24.

A dolly 46 is positioned below the water bath pan 36. The water bath pan 36 attaches to the main housing 12 with at pair of latches 47 to secure the water bath pan 36 to the main housing 12. The main housing 12 attaches to the dolly 46 and is held securely in place by a latch which is released upon activation of a release button 49. An interlock switch 48 is mounted to the main housing 12 and detects the presence of the water bath pan 36 when the dolly 46 is assembled to the main housing 12. The dolly 46 includes a seat 51 for the main housing and casters 50 are mounted to the dolly 46 to provide movable support for the vacuum cleaner assembly 10. The vacuum cleaner assembly 10 also includes a top cover 52 with a handle attached to the top of the main housing 12 to close off the top and cover the motor 17a, cooling fan 17b, support rings 18, and blower 19. The top cover 52, main housing 12, and dolly 46 when assembled enclose all inner components of the vacuum cleaner assembly 10.

The invention has been described in an illustrative manner, and it is to be understood that the terminology which has been used is intended to be in the nature of words of description rather than of limitation.

Modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vacuum cleaner assembly comprising:
   a main housing having an inlet, a recess remotely disposed from said inlet and integrally formed within said main housing, and an outlet positioned within said recess,
   a motor disposed within said housing between said inlet and said outlet for providing motive force to said vacuum cleaner assembly components,
   a fan mounted within said main housing driven by said motor for circulating air around said motor,
   a primary filter system for filtering of the air prior to being exhausted outwardly through said outlet,
   a secondary filter system placed in downstream airflow from said primary filter system, removably positioned within said recess and aligned with said outlet for additional filtering of the air prior to being exhausted outwardly through said outlet.

2. An assembly as set forth in claim 1, wherein said primary filter system comprises:
   a water bath pan within said main housing below said motor for holding a liquid bath and a separator mounted within said main housing, driven by said motor, extending downward into said water bath pan, for circulating the air and said liquid bath within said water bath pan and filtering particles of dust and dirt from the air prior to exhausting the air outwardly through said secondary filter system.

3. An assembly as set forth in claim 1, wherein said secondary filter system comprises a first filter and a carbon filter wherein said first filter and said carbon filter abut each other.

4. An assembly as set forth in claim 3, further comprising a one piece frame molded from styrene, wherein said first filter and said carbon filter are both glued into said frame with a glue and said frame is seated within said recess in said main housing.

5. An assembly as set forth in claim 4, wherein said glue is polyurethane based.

6. An assembly as set forth in claim 5, further comprising a gasket that is applied to said frame to seal between said frame and said main housing to prevent the escape of air around said frame.

7. An assembly as set forth in claim 6, wherein said gasket is made of polyurethane.

8. An assembly as set forth in claim 4, wherein said frame surface area adjacent said main housing is more than five times larger than said main housing outlet surface area.

9. An assembly as set forth in claim 8, wherein said frame surface area adjacent said main housing is nine times larger than said main housing outlet surface area.

10. An assembly as set forth in claim 3, wherein said first filter is not a HEPA rated filter.

11. An assembly as set forth in claim 3, wherein said first filter is a HEPA rated filter.

12. An assembly as set forth in claim 3, wherein said first filter is a pleated material where said pleats are separated into five stages across.

13. An assembly as set forth in claim 12, wherein said pleated material is polypropylene.

14. An assembly as set forth in claim 11, wherein said first filter is pleated material where said pleats are separated into nine stages across.

15. An assembly as set forth in claim 14, wherein said pleated material is glass fiber.

16. An assembly as set forth in claim 11, wherein said HEPA rated filter is made from a material that can be washed and reused.

17. An assembly as set forth in claim 3, wherein said carbon filter is made from reticulated urethane foam impregnated with activated charcoal.

18. A method of filtering air through a vacuum cleaner, comprising the steps of:
   (A) drawing air into a vacuum cleaner housing;
   (B) drawing air into a water bath to filter dirt and dust particles;
   (C) filtering particles of dust and dirt from the air through a separator;
   (D) filtering smaller particles of dust and dirt from the air through a first filter; and
   (E) filtering odors from the air through a carbon filter.

19. A vacuum cleaner assembly comprising:
   a main housing having an inlet, a recess integrally formed within said main housing, and an outlet positioned within said recess,
   a motor disposed within said housing between said inlet and said outlet for providing motive force to said vacuum cleaner assembly components,
   a fan mounted within said main housing driven by said motor for circulating air around said motor,
   a primary filter system for filtering of the air prior to being exhausted outwardly through said outlet,
   a secondary filter system placed in downstream airflow from said primary filter system and positioned within said recess directly adjacent said main housing outlet to allow the air to flow directly from said main housing outlet into said secondary filter system.

20. A vacuum cleaner assembly comprising:

a main housing having an inlet, a recess integrally formed within said main housing, and an outlet positioned within said recess, a motor disposed within said housing between said inlet and said outlet for providing motive force to said vacuum cleaner assembly components, a fan mounted within said main housing driven by said motor for circulating air around said motor, a primary filter system for filtering of the air prior to being exhausted outwardly through said outlet, and a secondary filter system generally rectangular shaped having a first transverse surface and a second transverse surface and positioned within said recess, wherein the air exiting from said main housing outlet enters said first transverse surface and the air exits from said secondary filter system through said second transverse surface into atmosphere.

* * * * *